United States Patent
Morissette

(10) Patent No.: US 6,314,654 B1
(45) Date of Patent: Nov. 13, 2001

(54) LIVESTOCK WEIGHT ESTIMATION DEVICE

(76) Inventor: Simon Morissette, 445, Rang St-François-Xavier, Ste-Cécile P.Q. (CA), G0X 2M0

(*) Notice: Subject to any disclaimer, the term of this patent is extended or adjusted under 35 U.S.C. 154(b) by 0 days.

(21) Appl. No.: 09/288,650

(22) Filed: Apr. 9, 1999

(51) Int. Cl.[7] .................................................... G01B 3/38
(52) U.S. Cl. ............................. 33/511; 33/783; 33/794; 33/797
(58) Field of Search ..................... 24/136 R, 115 M, 24/569; 33/511, 512, 755, 759, 756, 494, 679.1, 549, 555.01, 558.05, 558.06, 558.07, 783, 787, 788, 790, 792, 794, 795, 796, 802, 806, 807, 808, 810, 811

(56) References Cited

U.S. PATENT DOCUMENTS

| | | | |
|---|---|---|---|
| 263,602 | * 8/1882 | Shumway | 33/558.07 |
| 278,225 | * 5/1883 | Crittenden et al. | 33/558.07 |
| 288,770 | * 11/1883 | Brown | 33/558.07 |
| 571,788 | * 11/1896 | Peavey, Jr. | 33/558.06 |
| 720,773 | * 2/1903 | Ball | 33/558.05 |
| 4,279,260 | * 7/1981 | Stump | 33/512 |
| 4,688,653 | * 8/1987 | Ruble | 33/759 |
| 4,982,505 | * 1/1991 | Pocci | 33/808 |
| 5,148,606 | * 9/1992 | Mason et al. | 33/511 |
| 5,171,248 | * 12/1992 | Ellis | 33/558.4 |
| 5,319,860 | * 6/1994 | Pocci | 33/558.01 |

FOREIGN PATENT DOCUMENTS

| | | | |
|---|---|---|---|
| 865986 | * 2/1953 | (DE) | 33/759 |
| 17609 | * 3/1956 | (IT) | 33/558.03 |

* cited by examiner

Primary Examiner—Andrew H. Hirshfeld

(57) ABSTRACT

A caliper device for taking the dimension of an object such as livestock having caliper arms with hand members for gripping the rib cage of an animal and telescoping first and second members assembled for manual relative longitudinal movement when taking the dimension of the rib cage. The first member abutting the back of the animal and carrying the caliper arms and the second member carrying a cursor and weight graduations indicating an appropriate weight graduation, estimated according to the size of the rib cage when gripped by caliper arms and hand members. Other embodiments include the first member carrying a series of lights each marking a respective weight graduation or carrying a clock-like gauge system for indicating the estimated weight of an animal.

17 Claims, 4 Drawing Sheets

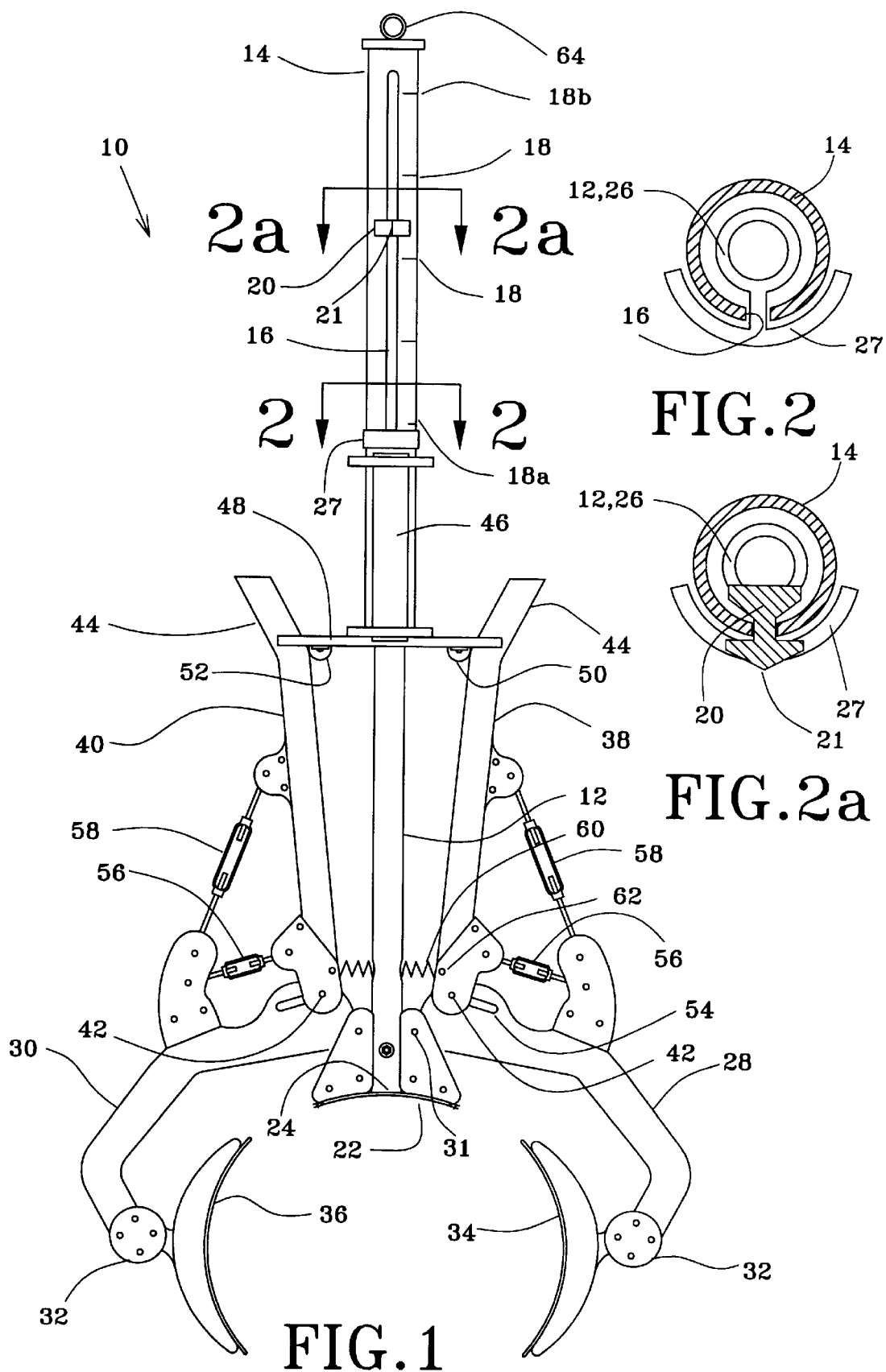

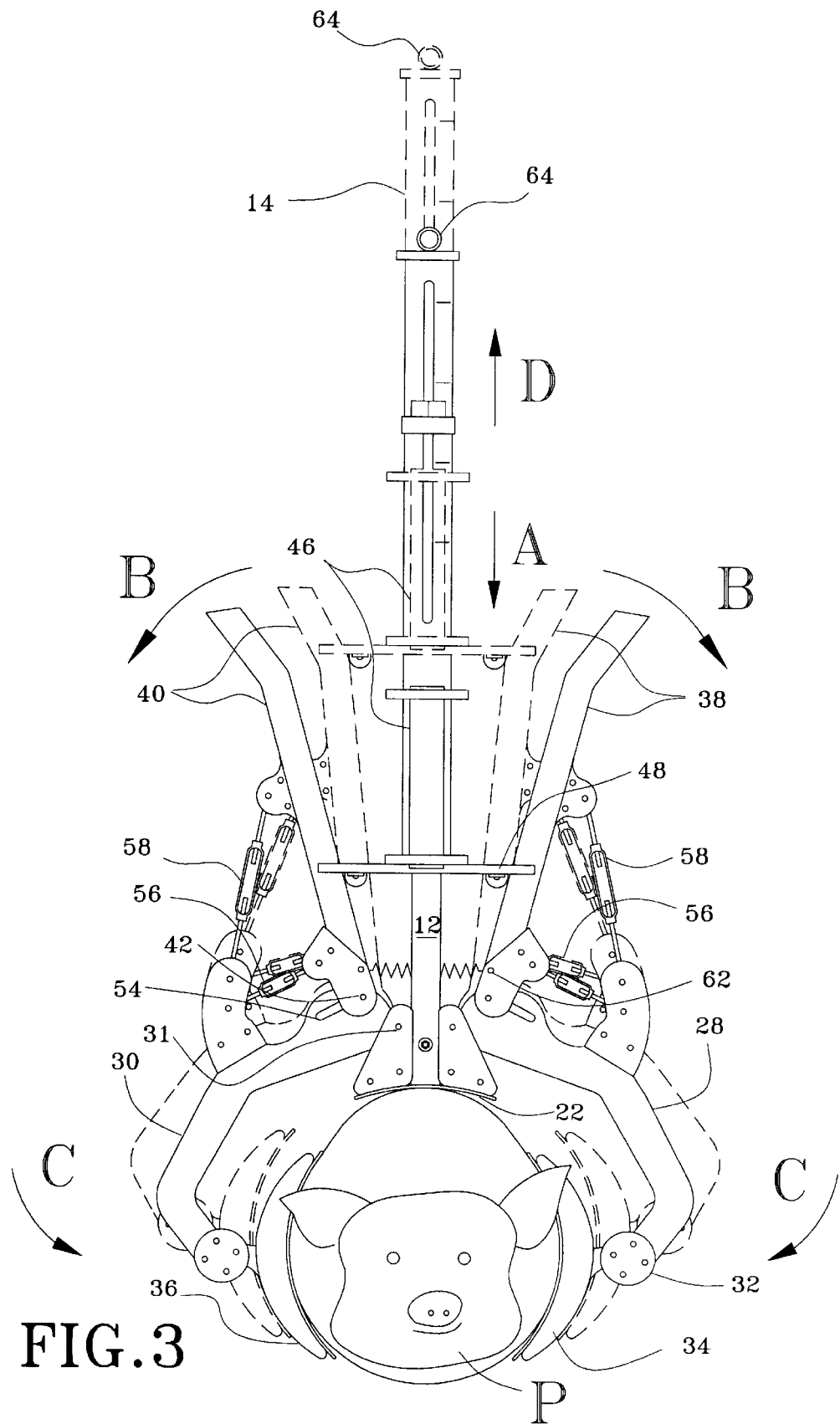

LIVESTOCK WEIGHT ESTIMATION DEVICE

FIELD OF THE INVENTION

The present invention relates to calipers and more particularly to a livestock weight estimation caliper device.

BACKGROUND OF THE INVENTION

Measuring the weight of livestock animals is a long and difficult task. A farmer must put each animal one at a time on a large expensive scale usually having a cage. It is important for farmers to know the weight of livestock in order to categorize the animals according to government regulations and market value hence, farmers will regularly measure and keep track of the weight of livestock. The farmer does not need to know the precise weight of an animal but must be able to categorize it in a given weight range.

Prior methods consist of using scales which as aforementioned is a long, difficult and expensive task especially if the livestock of a farmer is of a large quantity. The prior art has not taken into account the correlation between dimension and weight. Taking the dimension of an object will not give us the exact weight thereof but will indicate an estimated weight range with an acceptable margin of error. It must be noted that the weight-dimension correlation of a given type of object must be first understood so that appropriate weight estimations can be assigned to respective sizes.

OBJECTS OF THE INVENTION

The general object of the invention is to provide a caliper device that can take the dimension of an object and indicate the dimension on a scale marked on the device.

Another object of the present invention is to provide a caliper device for estimating the weight of livestock.

A further object of the present invention is to provide a livestock weight estimation device wherein the weight of livestock is estimated according to the width of the rib cage of an animal.

Yet another object of the present invention is to provide a livestock weight estimation device that is placed on the back of an animal and actuated to grip its sides thereby indicating the estimated weight of the animal.

Yet a further object of the present invention is to provide a livestock weight estimation device wherein the weight of an animal is estimated with an acceptable margin of error taking into account the inhaling and exhaling of the animal.

Still another object of the present invention is to provide a livestock weight estimation device which, that can quickly and easily be used and which is relatively inexpensive.

SUMMARY OF THE INVENTION

A caliper for taking the dimension of an object comprising:

first and second straight elongated parallel members assembled together for relative longitudinal movement;

an object engaging abutment secured to one end of the first member;

a pair of caliper arms pivotally carried by the one end of the first member on each side of the abutment for closing movement towards each other transversely of the first member from an open limit position to an object engaging position in which the spacing between the outer end portions of the caliper arms is equal to the dimension;

link devices connecting the second member to the caliper arms to cause the closing movement upon manually moving the second member relative to the first member towards the abutment;

graduations marked along the second member; and a cursor carried by the first member, the graduations being displaced relative to the cursor upon movement of the second member relative to the first member.

Preferably, the link devices include a pair of caliper arm extensions secured at their inner end to the respective caliper arms, extending away from the abutment along each side of the members and flaring in the direction of their free end portions and a spreader secured to the second member and slidably engaging the caliper arm extensions to cause their spreading and consequent closing movement of the caliper arms upon the movement of the second member towards the abutment.

Preferably, the caliper arm extensions are pivotally secured to the caliper arms at their inner ends and the link devices further include length adjustable stays connecting said caliper arms to said caliper arm extensions to adjust the angle between the caliper arms and their respective caliper arm extension to select the graduation which positions opposite the cursor for any given spacing between the outer end portions of the caliper arms.

A caliper according to the present invention includes an adjustment device to adjust the positions of the pivot connection of each caliper arm extension to its caliper arm transversely of the members to adjust the extent of pivotal movement of the caliper arms for a given amount of movement of the second member relative to the first member.

Preferably, the outer end portions of the caliper arms are arc-shape hand members pivotable about axes parallel to the pivotal axes of the caliper arms to the first member.

Preferably, the cursor is distinct from the first member and has a friction fit with the second member to remain positioned on the second member when the latter is moved away from the abutment.

Preferably, the members are telescopically assembled, the second member surrounding the first member and having a longitudinal slot, the first member having a second end located within the second member, the cursor extending through the slot and having an outer graduation reading portion and an inner portion releasably engageable by the second end of the first member, and a handle formed on the second member.

A caliper according to the present invention is preferably designed to take the width of the rib cage of an animal, the graduations indicating the weight of the animal.

Alternately, the graduations are a series of lights longitudinally aligned and carried by the second member. Each light has a respective switch, biased to the off position, mounted on the inner side of the second member so as to be turned to the on position one at a time when the second member is moved towards the abutment by a switch engaging protrusion carried by the second end of the first member and forming said cursor. Alternately, the members are telescopically assembled, with the second member surrounding the first member and carrying a clock-like gauge with the graduations marked thereon, the clock-like gauge further carrying a pivotable arrow-shaped indicator and having a spiral slot. The cursor being distinct from the first member and frictionally fitted to the spiral slot extending there though and having an outer graduation reading portion and a second outer portion engageable by the arrow shaped indicator. The arrow shaped indicator connected to a pivot carried by the inside of the first member, a pivoting system acting on the pivot to consequently turn arrow shaped indicator when moving the first member towards the abutment, causing the cursor to be displaced by the arrow shaped indicator along the spiral slot from an outermost portion to a centermost portion thereof and relative to the graduations hence, indicating a graduation.

Preferably, the pivoting system comprises a pinion carried by the pivot, the pinion being engaged by a complementary toothed rack carried by the second end of the first member, the pinion being rollingly displaced along the rack when moving the second member towards the abutment hence, acting on the pivot to turn the arrow shaped indicator.

BRIEF DESCRIPTION OF THE DRAWINGS

In the annexed drawings, like reference characters indicate like elements throughout.

FIG. 1 is a front view of one embodiment of the present invention;

FIGS. 2 and 2a are sectional views along lines 2—2 and 2a—2a of FIG. 1 respectively;

FIG. 3 is a front view of the same embodiment as in FIG. 1;

FIG. 7 is a perspective (view) of the cursor used in the embodiment of FIGS. 6 and 6a.

DETAILED DESCRIPTION OF THE PREFERRED EMBODIMENTS

Figure 4:
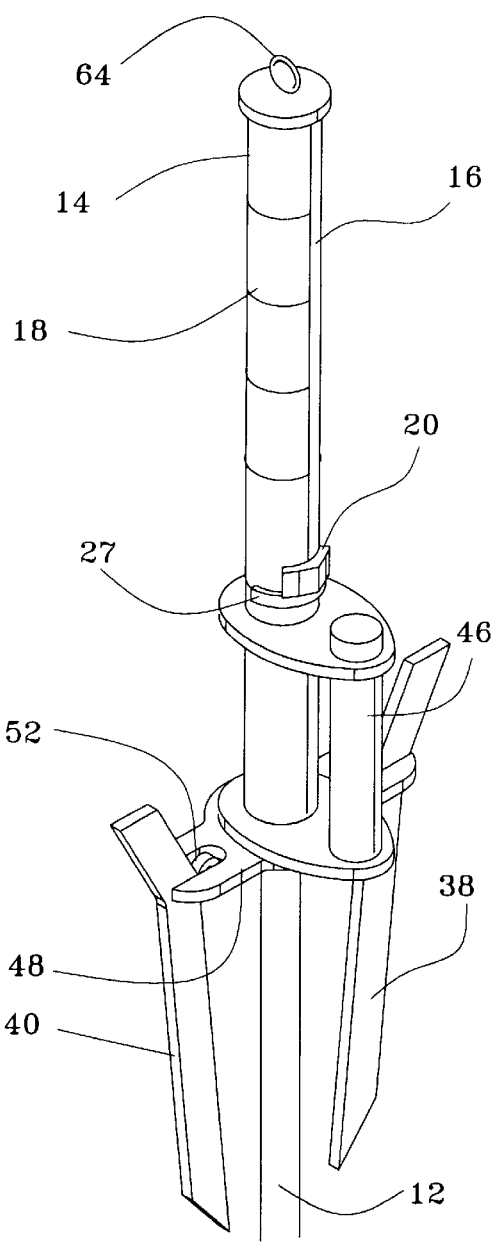
FIG. 4 is a perspective view of the top portion of the device.

Referring to FIG. 1 the present weight estimation device 10 being a caliper is shown having inner and outer straight telescoping members 12 and 14 respectively assembled together for relative longitudinal movement. The outer member 14 is upstanding from and surrounds the inner member 12 and is tubular to fit the first member 12 therein during relative longitudinal movement and also has a longitudinal slot 16 along which are marked graduations 18. A cursor 20 is fitted in slot 16 and extends therethrough with an inner portion releasably and frictionally engaging the wall of outer member 14 and having an outer graduation reading portion 21. The inner member 12 has an object engaging abutment 22 at its lower end 24 and an upper end 26 located within the outer member as shown in FIG. 2 below cursor 20 and acting as a cursor stop to maintain cursor 20 at a predetermined position when outer member 14 is moved down towards abutment 22. The top end 26 of inner member 12 forms a curved outer portion 27, outwardly extending of slot 16 and also acting as a graduation reading element if cursor 20 is not used.

A pair of caliper arms 28, 30 are pivotally carried by the inner member 12 at each side of abutment 22 for closing movement towards each other, transversely of first member 12, from an open limit position to an object engaging position. The caliper arms 28, 30 are pivoted by pivot pins 31 and carry at their free ends 32 arc shape hand members 34, 36 which are pivotable about axes parallel to the pivotal axes 31 of the caliper arms 28, 30 to the inner members 12 and which provide for securely gripping an object, preferably livestock. Each arm 28, 30 has a respective caliper arm extension 38, 40 attached at their inner end by a pin 42 to a respective caliper arm 28, 30 and extending away from abutment 22 along each side of inner and outer members 12,14 flaring in the direction of their free end portions 44.

As more clearly shown in FIG. 4 the present invention further includes a handle 46 formed on the outer member 14, for manual movement thereof, and upstanding from a spreader 48 also secured to the outer member 14. Spreader 48 slideably engages caliper arm extensions 38, 40 by means of rollers 50, 52 to cause their spreading and consequent closing movement of the caliper arms 28, 30 upon downward movement of the outer member 14 towards the abutment 22.

Pins 42 extend through slots 54 and their position can be adjusted therein by turnbuckles 56. Turnbuckles 58 attached to caliper arms 28, 30 and to their respective extension 38, 40 serve to adjust the angle defined by the same. A tension spring 60 attached at 62 to caliper extensions 38, 40 serve to bias the two caliper arms 38, 40 to open position.

Preferably, the present invention is used to estimate the weight of farm animals such as pigs, for example. Preferably, the graduations 18 are weight graduations with the smallest weight being marked at the lowest graduation 18a and the greatest weight marked at the highest graduation 18b along graduations 18. The user can estimate the weight of a farm animal as in FIG. 3 by moving cursor 20 down to abut top end 26 of inner member 12, placing abutment 22 on the back of animal P and positioning hand members 34, 36 around the rib cage of animal P, while caliper arms 28, 30 are in their open position, while holding the device 10 by handle 46 in order to stabilize it. Preferably, abutment 22 and hand members 34, 36 have rubber or other soft material on their engaging surfaces in order to avoid irritating animal P. The user can then proceed to manually move, as illustrated by arrow A, the outer member 14 towards abutment 22 with handle 46; as outer member 14, descends spreader 48 will spread extensions 38, 40, illustrated by arrows B, closing arms 28, 30, illustrated by arrows C, from their open position to a position where hand members 34, 36 firmly and fully grip the rib cage of the animal such that the distance between hand members 34, 36 is equal to the size of the rib cage hence, taking the width thereof.

Furthermore, when the outer member 14 is moved towards abutment 22, slot 16 and weight graduations 18 will be displaced relative to cursor 20 lo a position determined by caliper arms 28, 30 having closed to take the width of the rib cage. Since cursor 20 is distinct from inner member 12, frictionally engaged within slot 16, it will be stopped by top end 26 and extension 27 (see FIG. 2) of inner member 12 and will not be displaced along with outer member 14 as the latter moves towards abutment 22. It must be noted that cursor 20 is initially pushed down, before using device 10, against top end 26 and extension 27 of inner member 12. Therefore, when the width of the rib cage has been taken the user can lift up the second member 14 as the weight estimation device 10 is removed from the animal and cursor 20 will be in a new position, illustrated by arrow D, along slot 16 opposite the appropriate weight graduation, indicating the estimated weight of animal P. Telescoping first and second members 12, 14 are releasably yet tightly assembled so as to avoid their disassembly when user lifts second member. Second member 14 also includes a top end loop 64 so that the user can hang the present weight estimation device on a hook when finished. The present device 10 is accessible to a variety of animal sizes by the length adjustable stays 56, 58. Preferably the present livestock weight estimation device is made out of strong plastic material making it both durable and light to carry.

The present invention has considered the correlation between the width of the rib cage of farm animals such as pigs and their weight and has assigned appropriate weight estimations to a respective rib cage size. Device 10 provides the user to estimate the weight of a farm animal with a margin of error no greater than 10%, the margin of error having taken the exhaling or inhaling of the animal into account.

Figure 5:
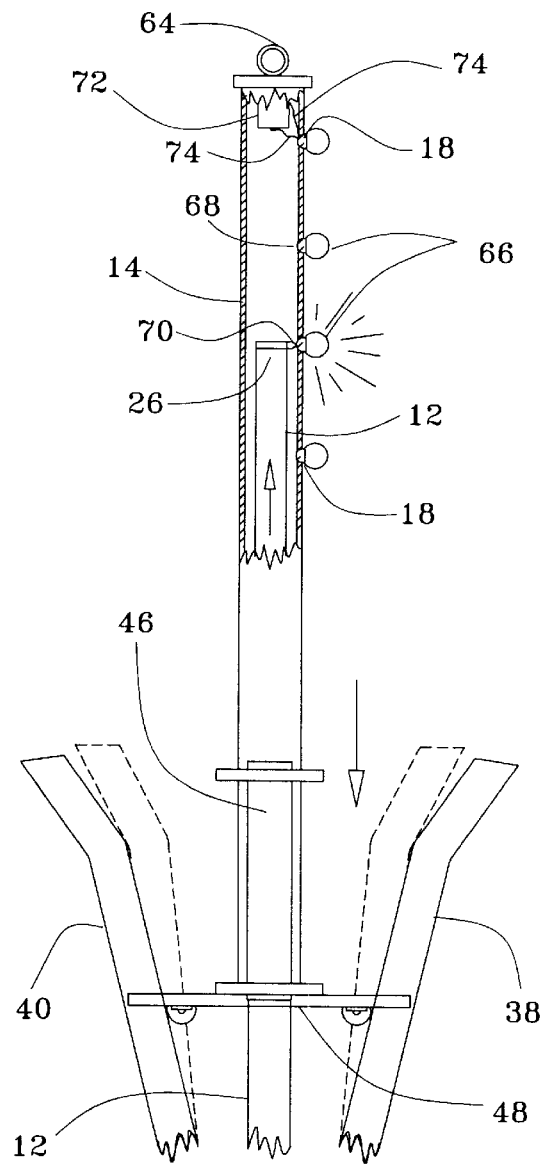
FIG. 5 is a front view partially in longitudinal section, of the top portion of another embodiment of the present invention.
Figures 6, 6A:
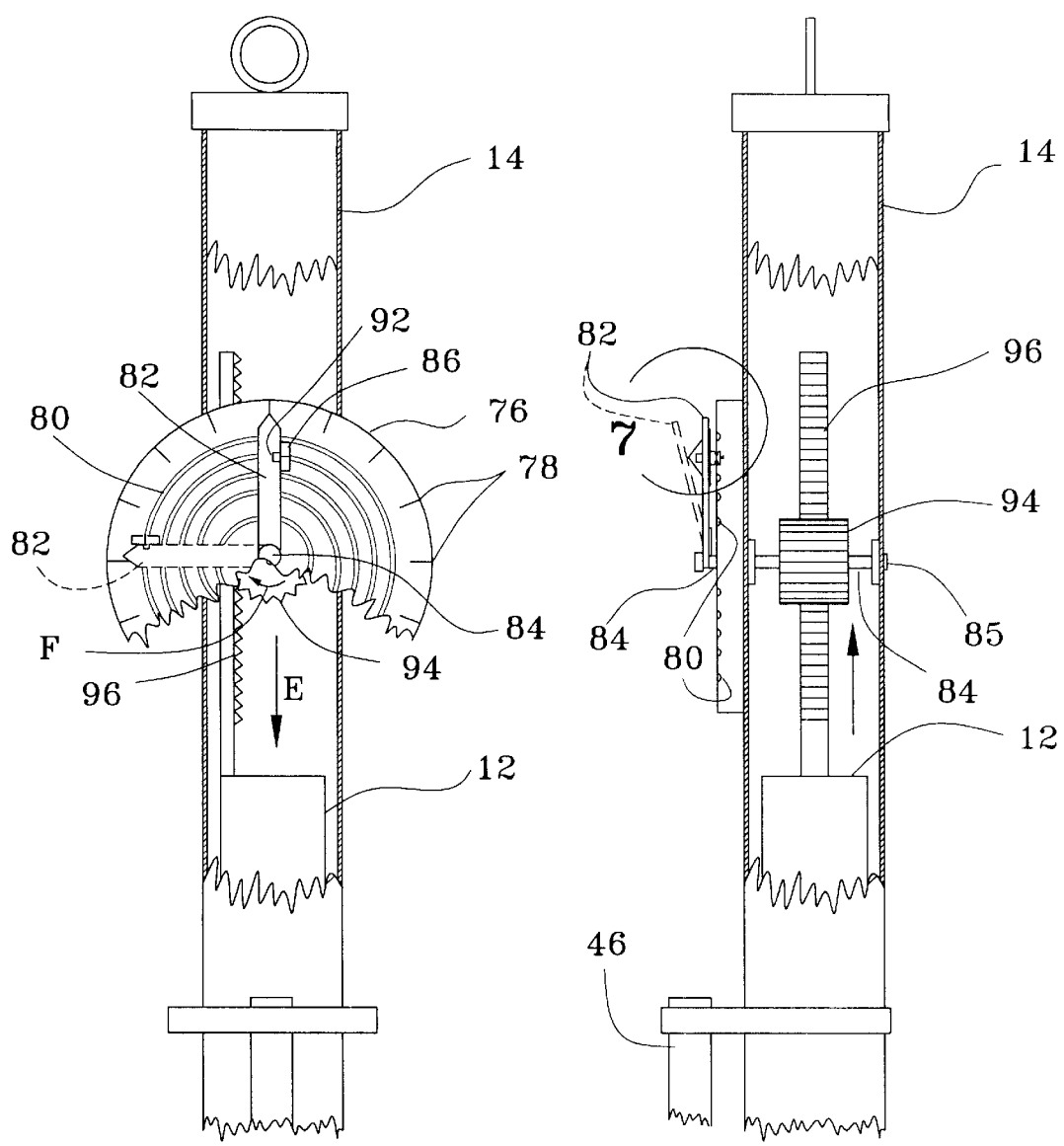
FIG. 6 is a front view partially in longitudinal section, of the top portion of a further embodiment of the present invention.
FIG. 6a is a broken side view of FIG. 6.

FIG. 5 illustrates another embodiment of the present invention wherein outer member 14 carries a series of outer longitudinally aligned lights 66 along weight graduations 18 with each light 66 opposite a respective graduation 18. Each light 66 has a switch 68 carried on the inner side of outer member 14 and biased to the off position. As outer member 14 is manually moved towards abutment 22, when taking the width of the rib cage of an animal, switches 68 are successively turned to the on position by a switch engaging protrusion 70 carried by the top end 26 of inner member 12. The powered light 66 marks a given weight graduation estimated according to the width, as taken by caliper arms 28, 30, of the rib cage of an animal P. Hence, the light will act as a cursor indicating the appropriate weight graduation. A battery 72 to power the lights 66 via wires 74 is preferably carried in the top of outer member 14 near loop 54 allowing the user easy access in order to replace battery 72 when need be.

Figure 7:
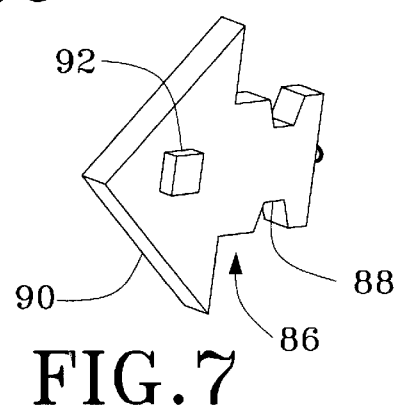

In a further embodiment shown in figs, 6, 6*a*, the outer member 14 carries a circular panel 76 with graduations 78 marked thereon in a circle. Panel 76 is formed with a spiral slot 80. A graduation indicator arm 82 is carried in front of panel 76 by an arm shaft 84 journalled at 85 and disposed across outer tubular member 14 at the center of the graduations circle. A flexible small cursor 86, having a shape similar to cursor 20, hereabove described and more clearly shown in FIG. 7, is fitted in spiral slot 80 extending therethrough with its inner notched portion 88 releasably and frictionally engaging spiral slot 80, to be displaced along the spiral slot 80 by arm 82, and having an outer graduation reading portion 90 which can be bent to clear the latter during its rotation in one direction. Arm 82 is also flexible to facilitate this clearance. A block 92 protrudes from one side of reading portion 90 to overlap and lock with arm 82 in the other rotational direction of arm 82. Shaft 84 also carries a pinion 94 which is engaged by a complementary toothed rack 96 carried by the inner member 12 and extending upwardly inside outer member 14.

When the user will take the dimension of an object as disclosed herein, second member 14 will be moved towards abutment 22 (arrow E) causing pinion 94 to be rotated by rack 96. Arm 90 will rotate in the direction of arrow F, which will displace cursor 86 along the spiral slot 80, since it is locked to cursor 86 by block 92 of cursor 86. The spiral slot 80 provides for arm 90 to make many turns about the clock-like panel 80 while displacing cursor 86 along spiral slot 80 towards the center of clock-like panel 80 hence, as cursor 86 is displaced from the outermost portion of the spiral slot 80 to the centermost portion, the user can see how many turns arm 82 has made at that given point. When the width of the object has been taken the user can lift outer member 14 as the present device 10 is removed from the given object. Arm 82 then rotates in the opposite direction and clears cursor 86 at each turn, allowing cursor 86 to stay in place. The user can evaluate a measurement after taking the dimension of an object, such as the estimated weight of a farm animal according the size of its rib cage, according to the position of the cursor 86 along the spiral slot 80 and relative to graduations 86. It must be noted that the cursor 86 must be placed at an initial position by the user depending on the assigned graduation system.

Although the embodiments of the present invention have been described with a certain degree of particularity they have been so by way of example only of the principles of the present invention and not as a limitation thereto hence, it must be understood that the invention disclosed herein includes further variations, modifications and embodiments within the scope and spirit of claims.

I claim:

1. A caliper for taking the dimension of an object comprising first and second straight elongated parallel members assembled together for relative longitudinal movement, an object engaging abutment secured to one end of said first member and a pair of caliper arms pivotally carried by said one end of said first member on each side of said abutment for closing movement towards each other transversely of said first member from an open limit position to an object engaging position in which the spacing between the outer end portions of said caliper arms is equal to said dimension, link devices connecting said second member to said caliper arms to cause said closing movement upon manually moving said second member relative to said first member towards said abutment, graduations marked along second member and a cursor carried by said second member, said graduations and cursor being relatively displaced upon movement of said second member relative to said first member, said link devices include a pair of caliper arm extensions respectively secured at their inner end to the respective caliper arms extending away from said abutment along each side of said members and flaring outwardly at their free end portions and a spreader secured to said second member and slidably engaging said caliper arm extensions to cause their spreading and consequent closing movement of said caliper arms upon said movement of said second member towards said abutment.

2. A caliper as defined in claim 1, wherein said caliper arm extensions are pivotally secured to said caliper arms at their inner ends, said link devices further including length adjustable stays to adjust the angle between said caliper arms and their respective caliper arm extension and therefore to select the graduation which positions opposite said cursor for any given spacing between said outer end portions of said caliper arms.

3. A caliper as defined in claim 2, said adjustable stays further including an adjustment device to adjust the positions of the pivot connection of each caliper arm extension to its caliper arm transversely of said members to adjust the extent of pivotal movement of said caliper arms for a given amount of movement of said second member relative to said first member.

4. A caliper as defined in claim 2 wherein said outer end portions of said caliper arms are arc-shaped hand members pivotable about axes parallel to the pivotal axes of said caliper arms to said first member.

5. A caliper as defined in claim 3 wherein said outer end portions of said caliper arms are arc-shaped hand members pivotable about axes parallel to the pivotal axes of said caliper arms to said first member.

6. A caliper as defined in claim 5 wherein said cursor is distinct from said first member and has a friction fit with said second member to remain positioned on said second member when the latter is moved away from said abutment.

7. A caliper as defined in claim 5 for taking the width of the rib cage of an animal, said graduations indicating the weight of said animal.

8. A caliper as defined in claim 1 wherein said outer end portions of said caliper arms are arc-shaped hand members pivotable about axes parallel to the pivotal axes of said caliper arms to said first member.

9. A caliper as defined in claim 8 for taking the width of the rib cage of an animal, said graduations indicating the weight of said animal.

10. A caliper as defined in claim 1 wherein said cursor is distinct from said first member and has a friction fit with said second member to remain positioned on said second member when the latter is moved away from said abutment.

11. A caliper as defined in claim 10 wherein said members are telescopically assembled, said second member surrounding said first member and having a longitudinal slot, said first member having its second end located within said second member, said cursor extending through said slot and having an outer graduation reading portion and an inner portion releasably engageable by said second end of said first member, and a handle formed on said second member.

12. A caliper as defined in claim 10 for taking the width of the rib cage of an animal, said graduations indicating the weight of said animal.

13. A caliper as defined in claim 11 wherein said outer end portions of said caliper arms are arc-shaped hand members pivotable about axes parallel to the pivotal axes of said caliper arms to said first member.

14. A caliper as defined in claim 11 for taking the width of the rib cage of an animal, said graduations indicating the weight of said animal.

15. A caliper as defined in claim 1 wherein said members are telescopically assembled, said second member surrounding said first member aid having an outer graduation reading portion, said cursor being a light provided by a series of separate lighting means longitudinally aligned, each said lighting means opposite a respective graduation, said first member having a second end located within said second member, each said lighting means having a respective switch, biased to the off position, mounted on the inner side of said second member so as to be turned to the on position one at a time, flashing said light, by a switch engaging protrusion carried by said second end of said first member when moving said second member towards the abutment, said light indicating a graduation, and a handle formed on said second member.

16. A caliper as defined in claim 1 wherein said members are telescopically assembled, said second member surrounding said first member and carrying a gauge with said graduations marked thereon, said gauge further carrying a pivotable arrow-shaped indicator and having a spiral slot, said cursor being distinct from said first member and frictionally fitted to said spiral slot extending there though and having an outer graduation reading portion and a second outer portion engageable by said arrow shaped indicator, said arrow shaped indicator connected to a pivot carried by the said second member, a pivoting system acting on said pivot to consequently turn the arrow shaped indicator when moving said second member towards said abutment, causing said cursor to be displaced by said arrow shaped indicator along said spiral slot from an outermost portion to a centermost portion thereof and relative to said graduations, said first member having a second end located within said second member, and a handle formed on said second member.

17. A caliper as defined in claim 16 wherein said pivoting system comprises a pinion carried by said pivot, said pinion being engaged by a complementary toothed rack carried by said second end of said first member, said pinion being rollingly displaced along said rack when moving said second member towards said abutment, acting on said pivot to turn said arrow shaped indicator.

* * * * *